C. JILLSON.

Wheel-Harrow.

No. 50,478.                                               Patented Oct. 17, 1865.

Witnesses:                                                Inventor:

UNITED STATES PATENT OFFICE.

C. JILLSON, OF WORCESTER, MASSACHUSETTS.

IMPROVEMENT IN HARROWS.

Specification forming part of Letters Patent No. 50,478, dated October 17, 1865.

*To all whom it may concern:*

Be it known that I, C. JILLSON, of the city and county of Worcester, and State of Massachusetts, have invented certain new and useful Improvements in Harrows; and I do hereby declare that the following is a full, clear, and exact description of the same, reference being had to the accompanying drawings, forming a part of this specification, in which—

Figure 1:
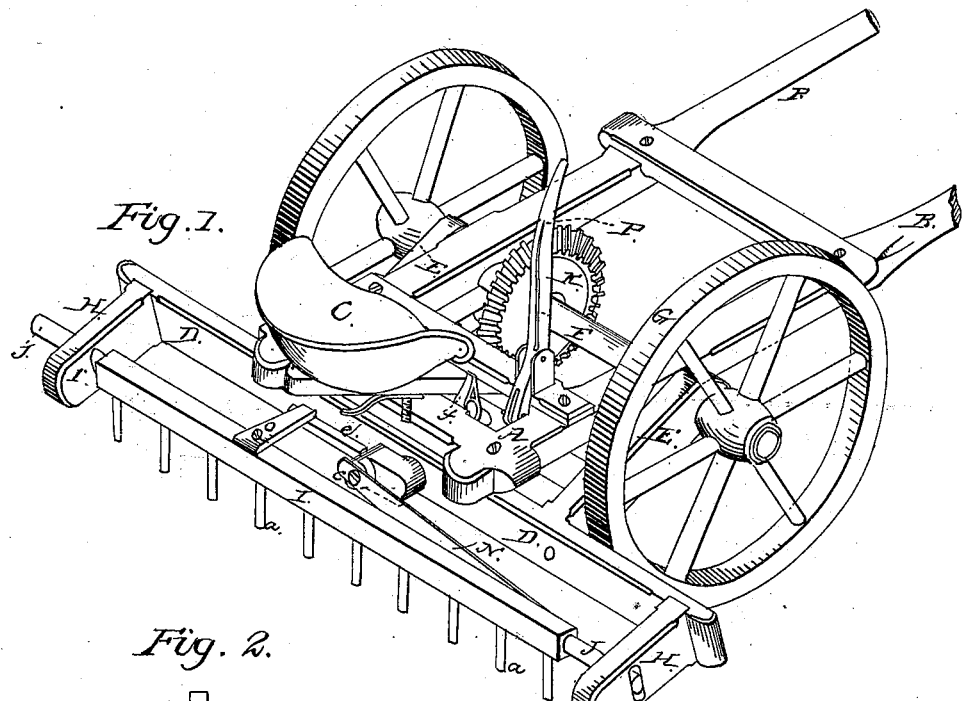
Figure 2:
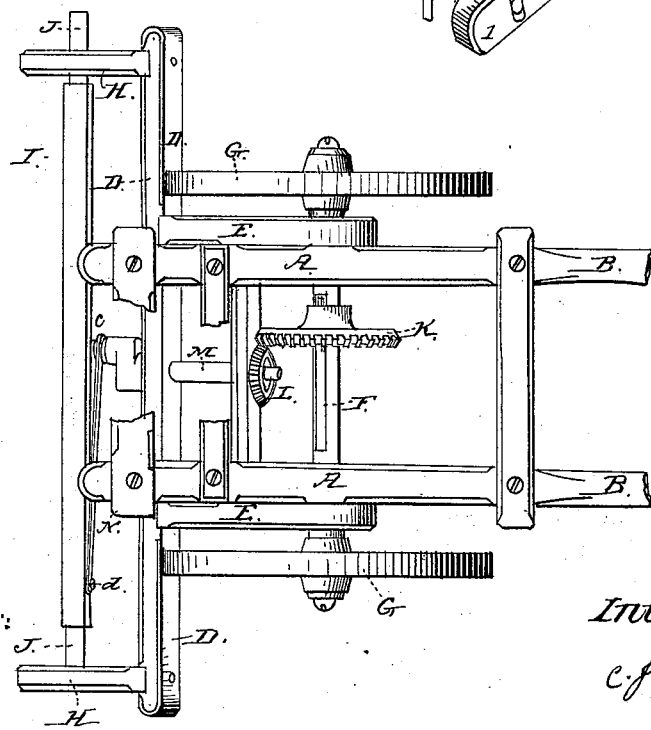

Figure 1 represents a perspective view of my improved harrow; and Fig. 2 represents a top or plan view, with some of the parts broken away to show the gearing and crank-shaft.

In the drawings, A represents the main frame, to which are attached the thills B, and upon which the driver's seat C is mounted and supported, as is fully shown in the drawings.

D is the harrow-frame, which is connected with the main axle F of the wheels G by means of arms E E. From each end of harrow-frame D an arm, H, projects back, and in these arms is supported the harrow I, having teeth *a*. The journals or bearings J J of the harrow are long, so as to permit of a lateral motion at right angles, or nearly so, to the line of motion of the machine.

The frame D is hung loose upon the main axle, and when the machine is drawn forward by the team the teeth *a* drag in the ground like a common harrow, while at the same time they have a rapid reciprocating motion at right angles to the line of motion of the machine, and which motion is imparted to the harrow D from the main axle F by means of the bevel wheel or gears K L, crank-shaft M, and connecting-rod N, the latter being connected with the crank-pin *c* and to swivel-pin *d* on the harrow I, all as fully indicated in the drawings.

Wheels G G are fast on the main shaft, which turns in proper bearings in both the main and harrow frames.

An arm, O, is fastened to the top of harrow I, and rests upon a plate or ledge, *e*, fastened to the frame D, whereby the harrow is retained in proper position when in operation. The arm O will permit the harrow-teeth to swing forward, but not back after the arm strikes plate *e*.

The driver can elevate the harrow and its frame D at pleasure by means of lever P, the rear lower end of which is connected with the frame D by a link, while its fulcrum is supported upon the frame A. When the frame D has been raised to the desired height a spring-catch, *f*, catches upon the rear cross-timber of frame A and holds the harrow in its elevated position until released by the operator.

By the use of this harrow all lumps and hard bunches and cakes of earth are finely separated and the ground left in the most desirable condition to receive the seed and produce a large and abundant crop.

The bearings of the journals J J of harrow I are oblong, as seen at 1 1, for the purpose of allowing one end of the harrow to rise independent of the other end, or the entire harrow can rise even without raising frame D. The harrow can thus conform freely to the inequalities of the ground over which it may be drawn.

Having described my improved harrow, what I claim therein as new and of my invention, and desire to secure by Letters Patent, is—

1. The combination of a harrow arranged for reciprocating action transversely to the path of the machine of a harrow-frame, connected, as described, with the axle of the driving-wheels by means of swinging arms, substantially as set forth.

2. The combination, with the harrow I and harrow-frame D, of the arm O and stop or plate *e*, substantially as set forth.

C. JILLSON.

Witnesses:
 THOS. H. DODGE,
 H. S. FULLER.